(12) United States Patent
Roussy et al.

(10) Patent No.: US 6,561,431 B2
(45) Date of Patent: May 13, 2003

(54) CARD READER AND THE MOBILE ELECTRONIC DEVICE EQUIPPED WITH IT

(75) Inventors: Pascal Roussy, Betton (FR); Stéphane Michel, Bromedou (FR); Yann Naslain, Rennes (FR); Jean-Marc Le Foulgoc, Chateaubourg (FR); Mickael Rouxel, Rennes (FR)

(73) Assignee: Mitsubishi Electric Telecom Europe, Nanterre (FR)

( * ) Notice: Subject to any disclaimer, the term of this patent is extended or adjusted under 35 U.S.C. 154(b) by 32 days.

(21) Appl. No.: 09/789,593

(22) Filed: Feb. 22, 2001

(65) Prior Publication Data
US 2001/0032882 A1 Oct. 25, 2001

(30) Foreign Application Priority Data
Feb. 24, 2000 (FR) .............................. 00 02342

(51) Int. Cl.⁷ ................................................ G06K 9/06
(52) U.S. Cl. ....................... 235/492; 235/486
(58) Field of Search ................... 235/486, 492

(56) References Cited

U.S. PATENT DOCUMENTS 5,615,250 A    3/1997   Kobayashi
6,315,207 B1 * 11/2001  Fisher et al. ............... 235/492

FOREIGN PATENT DOCUMENTS

WO        WO 98/13784        4/1998

* cited by examiner

Primary Examiner—Harold I. Pitts
(74) Attorney, Agent, or Firm—Oblon, Spivak, McClelland, Maier & Neustadt, P.C.

(57) ABSTRACT

The card reader has a body (12) defining a support area (30) for a card equipped with contact terminals (32). The body (12) has, on one side of the support area (30), tabs (34), for holding the card, extending partly facing the support area (30). The reader also has a lock, for retaining the card, which comprises a moving latch (52) for retaining the card. This latch (52) can move between a retaining position for said card and a release position for said card. The latch (52) is an integral part of said body (12).

12 Claims, 3 Drawing Sheets

CARD READER AND THE MOBILE ELECTRONIC DEVICE EQUIPPED WITH IT

FIELD OF INVENTION

The present invention relates to a card reader of the type having a body defining a support area for a card, said card reader having at least one contact terminal protruding from said support area, the or each contact terminal being designed to interact with at least one corresponding contact terminal on said card, the body having, on one side of said support area, at least one tab, for holding the card, extending partly facing said support area, the or each holding tab delimiting, with said support area, a channel for retaining one edge of said card, the reader further having a lock for retaining said card, which lock has a moving latch for retaining said card, said latch being movable between a retaining position for said card, in which said latch locks said card with respect to said support area, and a release position for said card, in which said latch unlocks said card from said support area.

Such a card reader is used, in particular, in an item of mobile telecommunication equipment, such as a portable telephone. In particular, such a reader is intended to accommodate a user identification card, in particular a SIM card.

BACKGROUND OF INVENTION

It is known practice in a portable telephone to provide a card reader whose body has a cavity defining an imprint of the card. One of the edges of this cavity has tabs for holding the card, and an opposite edge of the cavity has a moving lock for retaining the card.

This lock is formed by a metal blade mounted so that it can slide in guide rails defined in the body of the reader. The lock can thus move between a retaining position for the card, in which one end of the metal blade forming the latch extends above the card and immobilizes it, and a release position for the card, in which the latch is retracted, allowing the card to move. The lock is formed from a metal part which is added and is thus separate from the body of the connector, which is generally made of plastic.

Thus, the card reader is difficult to manufacture, notably because it is necessary to add the metal blade forming the lock onto the body of the reader, and because tight tolerances are necessary to allow correct guidance of the lock.

SUMMARY OF INVENTION

The aim of the invention is to propose a card reader whose manufacture is simplified and whose cost price is reduced.

To this end, the subject of the invention is a card reader of the type mentioned above, characterized in that said latch is made as one piece with said body.

According to a specific embodiment, the card reader has one or more of the following features:

it has resilient means for stressing said latch, said resilient stressing means holding said latch in the retaining position for said card on said support area;

said resilient stressing means have a resilient arm which is made as one piece with said body and said latch, said latch being borne by said resilient arm;

said resilient arm has two ends which are connected to said body and between which an elastically deformable section is defined, said section bearing said latch;

said resilient arm has a first end, which is connected to said body, and a second end, which is independent of said body and is free to move with respect to said body;

said second end of the arm and said body have associated protruding and hollow means limiting the range of movement for said second end of the arm;

said body has an open cavity for accommodating said card, said cavity having a bottom and an opening which are opposite one another, and said support area is delimited on said bottom and the or each holding tab extends through said opening;

in the retaining position for said card, said latch extends at least partly facing said support area, and, in the release position for said card, said latch extends away from said support area;

a passage opening for said card is made within said body to allow said card to move in a direction which is approximately parallel to said support area; in the retaining position for said card, said latch extends through said passage opening and at the periphery of said support area, and, in the release position for said card, said latch extends out of the way of said passage opening;

said support area has, in line with the or each holding tab, a recess for freeing the edge of said card;

said latch has a ramp forming a cam which is designed to interact with said card when it is fitted on said support area, which ramp is oriented to cause said latch to move as far as the release position for said card when the card is fitted.

The subject of the invention is also an item of mobile telecommunication equipment, characterized in that it has a casing having a wall in which a card reader is integrated, the body of the card reader being made as one piece with said wall. This item of equipment is a portable telephone, for example.

BRIEF DESCRIPTION OF THE DRAWINGS

The invention will be better understood on reading the description which now follows, is given solely by way of example, and is written with reference to the drawings, in which.

DETAILED DESCRIPTION

Figure 1:
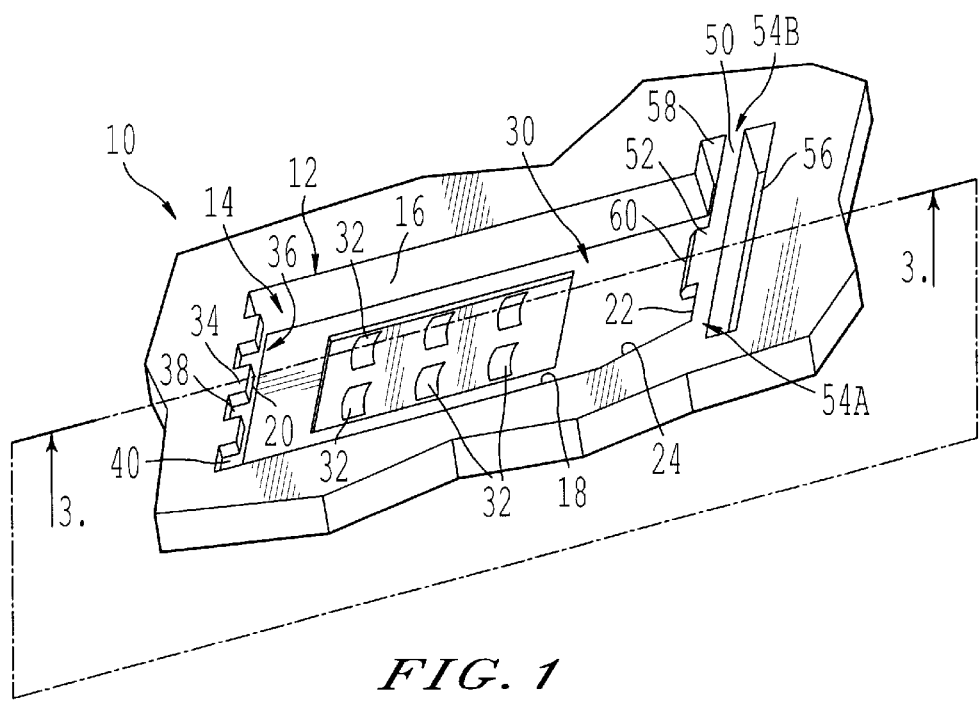
FIG. 1 is a perspective view of a first embodiment of a card reader according to the invention.

The card reader shown in FIG. 1 is intended for accommodating a user identification card for a portable telephone and, in particular, to allow it to be read. A card of this type is generally called a SIM card.

The reader 10 is produced in the rear face of the casing of a portable telephone. This rear face of the telephone is covered by a power supply battery when the telephone is in its use configuration, so that the card cannot be accessed when the battery is present.

The reader 10 has a body 12 formed by part of the rear wall of the portable telephone.

Figure 2:
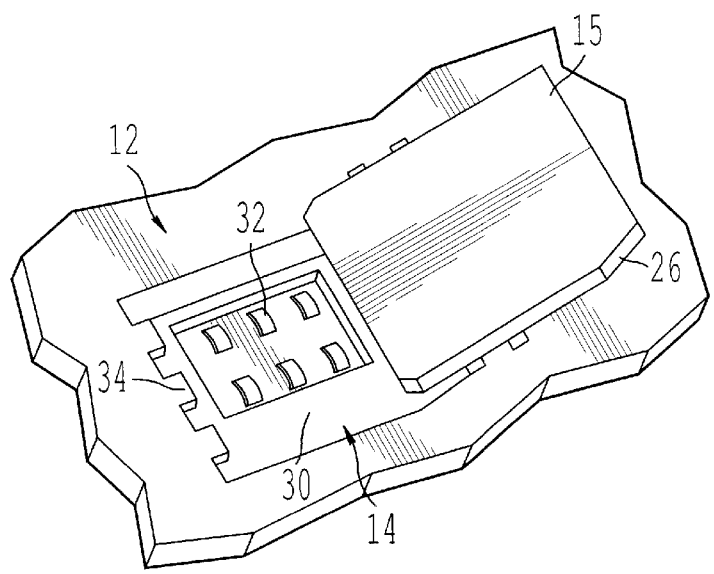
FIG. 2 is a perspective view of the card reader from FIG. 1, shown as a card is being fitted.

The body 12 delimits a cavity 14 whose shape is complementary to that of a SIM card, denoted by the reference 15 and shown in FIG. 2. Thus, the cavity 14 forms an imprint of the card so that it can accommodate the latter and therefore form a housing for accommodating the card.

The cavity 14 is generally of rectangular shape and is delimited by four lateral walls 16, 18 20, 22, parallel in pairs. The transverse walls 16 and 18 are shorter than the longitudinal walls 20 and 22.

The region in which the walls referenced 18 and 22 are connected has an inclined surface 24 designed to interact with a truncated corner 26 of the card 15.

The inclined surface 24 forms a means of assurance which makes it possible to ensure that the card is oriented correctly in the reader.

Finally, the housing 14 has a bottom 13 extending parallel to the outer surface of the rear wall of the telephone. Thus, the depth of the housing 14 is constant, and is greater than the thickness of the card 28. The bottom 30 forms a support area for the card.

Electrical contact terminals 32 protrude on the bottom 30 of the cavity. These contact terminals 32 are formed by resilient blades. They are designed to interact with corresponding terminals of an integrated circuit printed on the card 15.

In addition, the body 12 has, on the longitudinal edge 20 of the cavity, three tabs 34 for holding the card. According to other variant embodiments (not shown), the body 12 has, on the longitudinal edge 20 of the cavity, at least one tab 34 for holding the card. These tabs 34 are formed by protrusions distributed along the length of the edge 20. These protrusions extend partly facing the bottom 30. They are spaced apart from the bottom by a distance which corresponds approximately to the thickness of the card 15. Thus, the tabs 34 extend as an overhang above the bottom 30. The tabs 34 define with the bottom 30 a channel 36 for retaining one edge of the card.

Figure 3:
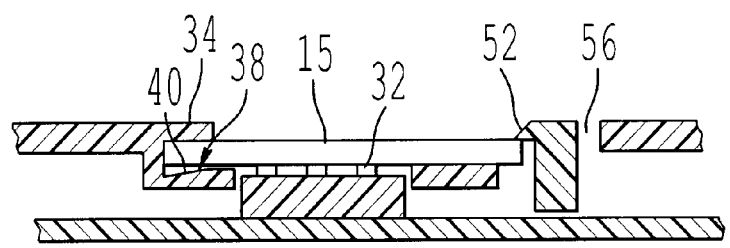
FIG. 3 is a sectional view of the card reader from FIG. 1, seen along the plane 3—3, with a card installed in the reader.

Facing the holding tabs 34, the bottom 30 has a recess 38 for freeing the card, which can be seen in FIG. 3. This recess is delimited by a ramp 40 which is inclined from the flat part of the bottom 30 up to the edge 20, so that the thickness of the cavity 14 increases progressively towards the edge 20.

The transverse edge 22 of the cavity, opposite the edge 20 which has the tabs 34 for holding the card, is formed by a resilient arm 50 bearing a latch 52 for retaining the card. The arm 50 and the latch 52 form a lock for retaining the card. They are both an integral part of the body 12 of the card reader.

More precisely, in the embodiment shown in FIGS. 1 to 3, the arm 50 extends parallel to the edge 20, in the absence of any constraint.

It is formed by a rectilinear beam which is attached to the body 12 only at its two ends 54A, 54B, where the beam is an integral part of the body.

A slot 56 which extends along the whole length of the arm 50 is made behind the arm, on the opposite side from the cavity 14 with respect to the arm 50. The slot 56 extends parallel to the edge 20.

The length of the arm 50 is greater than that of the edge 20, so that the arm continues beyond the transverse edge 16. In this continuation region, the arm 50 is bordered on both sides by the slot 56 and by a notch 58 made in the edge 16.

The latch 52 is formed by a protrusion provided in the central part of the face of the arm 50 delimiting the cavity 14. This protrusion extends as an overhang above the bottom 30, in the absence of any stress applied to the arm 50. The protrusion is produced at a distance from the bottom 30 which is greater than the thickness of the card 15.

A ramp 60 is formed on the outer surface of the latch. This ramp is inclined towards the bottom of the cavity 14, from the arm 50 towards the free end of the latch.

The ramp is designed to interact with a rear edge of the card 15 and to cause the arm 50 to deform elastically into the slot 56 as a result of a cam effect.

As shown in FIG. 2, to fit a card into the reader, a front edge of the card, opposite the edge which has the truncated corner 26, is inserted into the cavity 14. It is pushed until it is accommodated in the holding channel 36. Fitting the card into the channel 36 defined between the bottom 30 and the holding tabs 34 is made easier by the presence of the recess 38, which allows the card to be held inclined with respect to the bottom 30.

In this position, the rear edge of the card is then pushed well in towards the bottom of the cavity. The rear edge of the card is thus pressed onto the ramp 60. The force exerted by the card on the ramp 60 causes, as a result of a cam effect, elastic deformation of the arm 50, which then moves into the slot 56, thus causing the latch 52 to move out of the cavity 14. The movement of the latch 52 allows the card 15 to pass, and it can then be pressed onto the bottom 30.

When the card 15 is supported on the bottom 30 in this manner, the latch 52 is automatically brought back into a retaining position above the card 28 due to the elasticity of the arm 50, which is then no longer under stress. In this position, the arm 50 extends along the rear edge of the card, while the latch 52 extends above the card facing the support area for the card. Thus, the card is retained on the bottom 30 while being held, at one end, by the holding tabs 34, and, at its other end, by the latch 52, as shown in FIG. 3.

The item of telecommunication equipment can then, in particular, read the information contained in the card as a result of the mechanical contact between the contact terminals 32 contained in the body 12 of the reader and the corresponding terminals provided on the card 15.

To take the card out of the reader, the user brings the latch 52 back into its retracted position by pushing it back, for example using a fingernail, in the direction of the slot 56. Due to the action of the force exerted on the latch, the arm 50 deforms elastically inside the slot 56, thus allowing the latch 52 to be freed from the upper surface of the card. The card is thus released.

Due to the elasticity of the contact terminals 32, the rear edge of the card, initially retained by the latch 52, is now out of the cavity 14. It should be noted that the contact terminals 32 are in a region close to the holding tabs 34. Thus, the elasticity of the contact terminals 32 allows the card 15 to be pushed easily above the latch 52. The operator can then take hold of the card.

Figure 4:
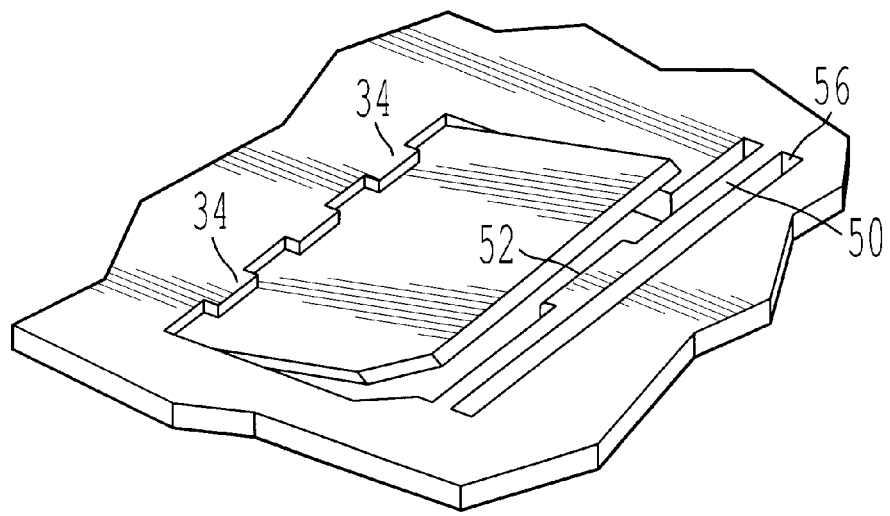
FIG. 4 is a perspective view of the card reader from FIG. 1, shown as a card is being taken out.

FIG. 4 shows the card when it has been taken out. It will be noted that its edge opposite the edge held by the tabs 34 is raised under the elasticity of the contact terminals, making it easy to grasp the card.

Figure 5:
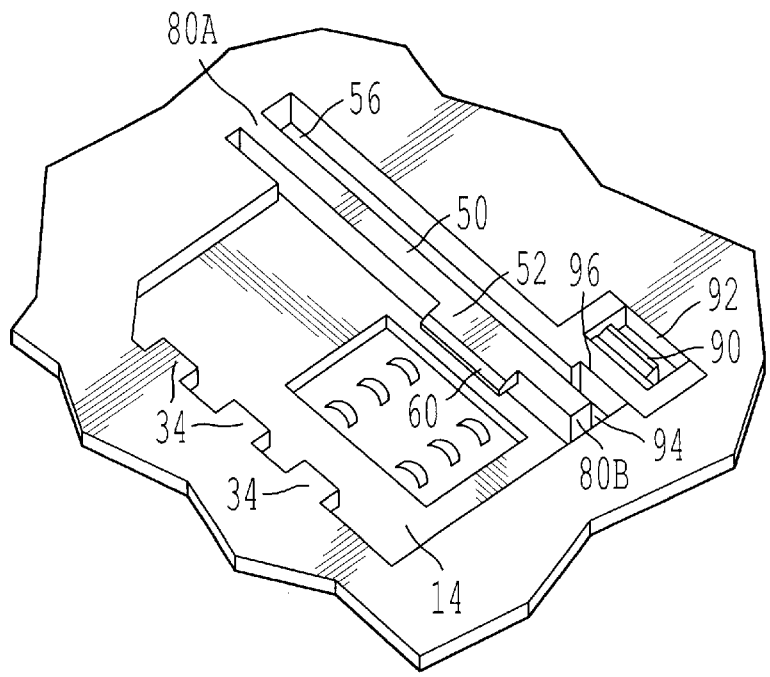
FIG. 5 is a perspective view of a second embodiment of a card reader according to the invention.

In the embodiment shown in FIG. 5, three retaining tabs 34 extend along one longitudinal edge of the cavity.

The resilient arm 50 is arranged on the opposite side. In this embodiment, it is connected to the body 12, of which it is an integral part, only at one end 80A, the opposite end of the arm 80B being independent of the body 12 of the reader.

As previously, the arm 50 bears a latch 52 for retaining the card. This latch 52 protrudes normally to the plane defined by the cavity 14 above the bottom 30. On the opposite side from the cavity 14, the arm 50 is bordered by the slot 56.

In this embodiment, the free end 80B of the arm is equipped with a peg 90 retained in an oblong opening 92 delimited in the body 12 of the reader. The peg 90 is connected to the end 80 of the arm by a bow 94 extending immediately above the bottom of the slot 56. The bow 94 extends below a crosspiece 96 delimiting the oblong opening 92 and separating it from the slot 56. The peg 90 is thus accommodated so that it can move freely in the oblong opening 92.

When a card is inserted, or when it is removed, the latch 52 is retracted outside the access passage to the cavity 14 as a result of elastic deformation of the arm. This deformation is limited by the peg 90 possibly reaching its maximum extent in the oblong opening 92.

Thus, the peg 90, bearing against one or other of the opposite faces of the oblong opening, defines, on the one hand, a retaining position for the latch 52, in which it extends above the support area for the card, and, on the other hand, a position of maximum deformation of the arm, in which the latch 52 is retracted and is remote from the support area for the card.

Figure 6:
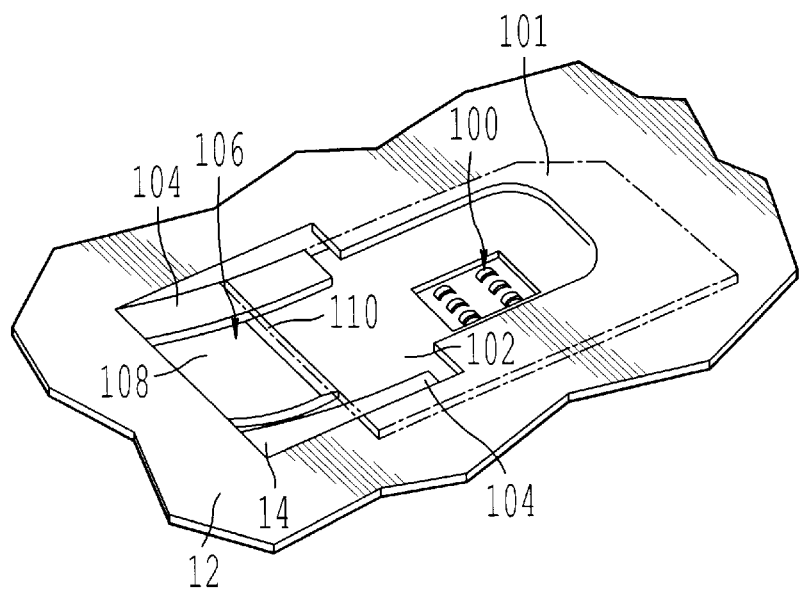
FIG. 6 is a perspective view of a third embodiment of a card reader according to the invention.

In the embodiment shown in FIG. 6, the body has a cavity 100 for accommodating the card, fitted with contact terminals designed to interact with the card. This cavity has the same width as and is longer than a SIM card. The depth of the cavity is greater than the thickness of the card.

The cavity 100 is partly covered by a web 101 extending above the bottom, denoted by 102, of the cavity. This web extends along one transverse edge and partly along the length of the two adjacent longitudinal edges. This web is separated from the bottom by a height which corresponds approximately to the thickness of the card.

The end of the cavity opposite the one which has the web forms a region for inserting the card. Two ramps 104 for guiding the card are arranged in the cavity in the region for inserting the card. These ramps extend along opposite longitudinal edges of the cavity. They are inclined from the surface of the body, in which the cavity is delimited, approximately as far as the bottom of this cavity.

Furthermore, a lock 106 which is an integral part of the body 12 is arranged in the cavity at the end for inserting the card. This lock 106 has a resilient blade 108 whose end 110 forms a latch. This blade 108 is produced between the two ramps 104.

The blade 108 is connected to the body in the upper region of the transverse edge, that is to say in the vicinity of the surface of the wall in which the cavity is delimited.

When at rest, the blade 108 is such that its end forming the latch 110 extends above the surface of the ramps 104. This blade is elastically deformable, so that, by pressing on its end 110, this end can be retracted below the surface defined by the two ramps 104.

The card is inserted into the reader by being slid along the ramps 104. As it slides, the end 110 of the blade is brought into its retracted position as a result of the blade 108 deforming elastically. When the card has been completely accommodated in the cavity, and the rear edge of the card crosses the end forming the latch 110, the blade 108 is released and the end forming the latch 110 adopts its rest position again, which is equivalent to the retaining position for the card, in which it extends approximately along the thickness of the card above the surface defined by the ramps 104. In this retaining position for the card, it will be seen that the end forming the latch 110 prevents the card from coming out.

The presence of the web 101 and of the end forming the latch 110 holds the card in the cavity, the card then being in contact with the contact terminals protruding on the bottom of the cavity.

To remove the card, the operator applies manual pressure on the blade 108 in order to retract the end forming the latch 110 below the surface of the ramps 104. The card can then be removed by being slid over the ramps 104.

Whatever the embodiment, it will be seen that, as a result of the latch of the retaining lock for the card being an integral part of the body of the connector, the cost of the connector is then much reduced. Furthermore, no specific adjustment is necessary between the lock and the body of the connector.

Finally, the elasticity of the blade or of the arm bearing the latch ensures that the latch is automatically in its retaining position for the card due to the elasticity of the blade or of the arm supporting it.

What is claimed is:

1. A mobile electronic device, including a card reader and a casing having a wall, said card reader comprising:

a body configured to define a support area for a card;

a lock comprising a moveable latch configured to retain said card, said latch configured to move between a card retaining position in which said card is locked with respect to said support area and a card release position in which said card is unlocked from said support area; and at least one contact terminal configured to protrude beyond said support area and to make contact with a corresponding at least one contact terminal on said card, wherein said body comprises at least one tab on one side of said support area, said at least one tab configured to hold said card and to partially extend facing said support area, said at least one tab and said support area are arranged to delimit a channel configured to retain one edge of said card, and said card reader is integrated in said casing wall and said latch is integrated with said body being integrated in said casing wall.

2. The mobile electronic device according to claim 1, further comprising:

resilient means configured to stress said latch and to hold said latch in said card retaining position.

3. The mobile electronic device according to claim 2, said resilient stressing means comprising a resilient arm integrated with said body and said latch and configured to hold said latch.

4. The mobile electronic device according to claim 3, said resilient arm comprising:

two ends each connected to said body and arranged to define an elastically deformable section configured to hold said latch.

5. The mobile electronic device according to claim 3, said resilient arm comprising:

a first end connected to said body and a second end configured to move freely with aid body.

6. The mobile electronic device according to claim 5, second end and said body comprising:

corresponding protruding and hollow means configured to limit a range of movement of said second end.

7. The mobile electronic device according to claim 1, said body comprising:

an open cavity configured to accomodate said card and comprising a bottom and an opening arranged opposite of said bottom, wherein said bottom is configured to delimit said support area and said at least one tab is configured to extend through said opening.

8. The mobile electronic device according to any of claims 1–7, wherein said latch is configured to extend at least partly facing said support area when said latch is in said card retaining position and to extend away from said support area when said latch is in said card release position.

9. The mobile electronic device according to any of claims 1–7, said body further comprising:

a passage opening configured to allow said card to move in a direction approximately parallel to said support area, wherein said latch is configured to extend through said passage opening when said latch is in said card retaining position and to extend away from said passage said passage opening when said latch is in said card release position.

10. The mobile electronic device according to any of claims 1–7, said support area comprising:

a recess arranged in line with the at least one tab and configured to free the edge of said card.

11. The mobile electronic device according to any of claims 1–7, said latch comprising:

a ramp configured to form a cam configured to interact with said card when said card is fitted on said support area and to cause said latch to move to said card release position when said card is installed.

12. The mobile electronic device according to any of claims 1–7, comprising:

a portable telephone.

* * * * *